United States Patent
Ormond

(10) Patent No.: US 7,730,393 B2
(45) Date of Patent: Jun. 1, 2010

(54) SYSTEM AND METHOD FOR PROVIDING FEE-BASED DATA SERVICES TO MOBILE USERS

(75) Inventor: Louis Ormond, Irvine, CA (US)

(73) Assignees: Toshiba Corporation (JP); Toshiba Tec Kabushiki Kaisha (JP)

(*) Notice: Subject to any disclaimer, the term of this patent is extended or adjusted under 35 U.S.C. 154(b) by 1150 days.

(21) Appl. No.: 11/071,420

(22) Filed: Mar. 3, 2005

(65) Prior Publication Data

US 2006/0200735 A1 Sep. 7, 2006

Related U.S. Application Data

(60) Provisional application No. 60/589,380, filed on Jul. 20, 2004.

(51) Int. Cl.
- G06F 17/00 (2006.01)
- G06Q 40/00 (2006.01)
- G06Q 20/00 (2006.01)

(52) U.S. Cl. ............ 715/234; 705/44; 705/16
(58) Field of Classification Search ............ None
See application file for complete search history.

(56) References Cited

U.S. PATENT DOCUMENTS

| | | | | |
|---|---|---|---|---|
| 4,839,829 A * | 6/1989 | Freedman | ............ | 715/751 |
| 5,901,067 A | 5/1999 | Kao et al. | | |
| 5,930,810 A * | 7/1999 | Farros et al. | ............ | 715/201 |
| 5,937,395 A | 8/1999 | Iwamura | | |
| 5,956,698 A | 9/1999 | Lacheze et al. | | |
| 6,119,934 A | 9/2000 | Kolls | | |
| 6,429,923 B1 * | 8/2002 | Ueda et al. | ............ | 355/40 |
| 6,484,934 B2 | 11/2002 | Salgado | | |
| 6,606,602 B1 * | 8/2003 | Kolls | ............ | 705/14 |
| 6,618,772 B1 * | 9/2003 | Kao et al. | ............ | 710/15 |
| 6,859,832 B1 * | 2/2005 | Gecht et al. | ............ | 709/224 |
| 6,891,636 B1 * | 5/2005 | Kawai et al. | ............ | 358/1.18 |
| 6,924,906 B1 * | 8/2005 | Schwier et al. | ............ | 358/1.6 |
| 2003/0074261 A1 * | 4/2003 | Norris | ............ | 705/17 |
| 2006/0017966 A1 * | 1/2006 | Ormond | ............ | 358/1.15 |

* cited by examiner

*Primary Examiner*—F. Ryan Zeender
*Assistant Examiner*—Mussa Shaawat
(74) *Attorney, Agent, or Firm*—Tucker Ellis & West LLP

(57) ABSTRACT

The present invention is directed to a system and method to allow users to access and use data services, and then charge for such services using a point of sale system. Information about various services capable of being performed by a multifunction peripheral device is provided to the user, as well as the available payment options. The user selects the services to be performed and then selects the appropriate payment option. The user then provides selected information about the service the user wants to be performed. The user is then presented with the total cost of the service. Upon the user accepting the charges, the service is performed. The details of the transaction are archived and the user is billed for the service. The multifunctional peripheral device submits an authorization request to the point of sale server. The point of sale server authorizes or rejects the transaction request. If the transaction is authorized, the transaction details are transmitted to the point of sale server. The transaction request is then closed and a confirmation is transmitted to the multifunctional peripheral device.

15 Claims, 3 Drawing Sheets

SYSTEM AND METHOD FOR PROVIDING FEE-BASED DATA SERVICES TO MOBILE USERS

This application is a Continuation of application Ser. No. 60/589,380, filed on Jul. 20, 2004.

BACKGROUND OF THE INVENTION

This invention teaches a system and method for providing data services. More particular, this invention is directed to a system and method to allow users to access and use data services, such as scanning, printing, and distribution of documents and data, and then charge for such services.

Typically, professionals routinely work with documents or other data while away from their office environment. These professionals need to generate or propagate data, such as image data, by printing a document, and then to need to distribute or perform other functions on such image data. Mobile access is suitably accomplished via a laptop computer, notepad computer, personal digital assistant, cellular telephone, and the like. Multifunctional peripheral devices, such as printers and scanning devices, routinely perform such operations. However, there is no easy or cost effective way for these mobile users to use these existing technologies in a non-office environment or a public facility. Currently publicly accessed multifunctional peripheral services may be operated on a per copy basis via system such as coin operated devices, identification card readers, or key counters. There is no mechanism or device for seamlessly integrating a mobile multifunctional peripheral system to a point of sale system in order to allow for credit or prepaid card charges, including the authorization and posting of charges for services.

There is a need for system and method to allow users in a non-office environment to access and use data services, and then charge for such services using a point of sale system.

SUMMARY OF THE INVENTION

In accordance with the present invention, there is provided a system and method to allow users to access and use data services, and then charge for such services using a point of sale system.

Further, in accordance with the present invention, there is provided a system and method to allow users to access and use data services which will manage the collection of user financial and transaction data.

Further, in accordance with the present invention, there is provided a system and method to allow users to access and use data services which integrates such system with a point of sale system and allows for credit or prepaid charges, and the authorization and posting of user transaction charges.

In the present invention, a user has access to a multifunctional peripheral device. Preferably, the user is provided access to such multifunctional peripheral device in a non-office environment, such an airport lounge or hotel business center. The user is given information about the various services available and the available payment options. The user then selects the services to be performed. The user then selects the appropriate payment option. The user then inputs selected information about the service the user wants to be performed. The user is then presented with the total cost of the service. Upon the user accepting the charges, the service is performed. The details of the transaction are archived and the user is billed for the service. The multifunctional peripheral device submits an authorization request to the point of sale server. The point of sale server authorizes or rejects the transaction request. If the transaction is authorized, the transaction details are transmitted to the point of sale server. The transaction request is then closed and a confirmation is transmitted to the multifunctional peripheral device.

Further, in accordance with the present invention, there is provided a document processing system and method for use in a point-of-sale environment. The system and method include a document processor, which document processor includes functionality of at least one of a printer, facsimile, scanner, copier, and optical character recognition device. A document processing request is received from an associated user for a document processing operation to be performed on the document processor. The request data representative of a received document processing request is communicated to an associated point-of-sale server, which request data includes data representative of an identity of the associated user and data representative of the document processing request. An authorization signal is received from the associated point-of-sale server, which authorization signal is representative of an approval or rejection of the document processing request and the document processor is enabled in accordance with a received authorization signal. Accounting data representative of a completed document processing operation associated with the authorization signal is generated and communicated to the associated point-of-sale server.

In a preferred embodiment, a close transaction request is sent to the associated point-of-sale server after completion of document processing operation. In a more preferred embodiment, a confirmation signal representative of a successful transmission of the a close transaction request is received from the associated point-of-sale server.

In another embodiment, the document processing request includes data representative of a selected payment mechanism to secure payment of the document processing request. Preferably, the payment mechanism is at least one of a credit-based transaction and a debit-based transaction.

In one embodiment, the point-of-sale server to which the request data is communicated and for which the authentication of such request is determined is able to be selected by the user or other authorized party.

In yet another embodiment, in the event of a rejection of the document processing request, a notification of the rejection is transmitted to the associated user. Additional information relating to the document processing request is received from the associated user and communicated to the associated point-of-sale server. An authorization signal is received from the associated point-of-sale server, wherein the authorization signal is representative of at least one of an approval and a rejection based on the additional information related to the document processing request.

Still further, in accordance with the present invention, there is provided a system and method for using a point-of-sale server in a document processing system. Request data representative of a user-generated document processing request is received from an associated document processor, wherein the request data includes data representative of an identity of an associated user and data representative of a selected document processing transaction. The acceptability of the document processing transaction is verified in accordance with received request data and an authorization signal representative of an approval or rejection of the document processing request is generated in accordance with an output of the verification means. Accounting data representative of a completed document processing operation is received from the associated document processor.

In a preferred embodiment, a close transaction request is received from the associated document processor server after completion of document processing operation. In a more preferred embodiment, a confirmation signal representative of a successful transmission of the close transaction request is generated and communicate to the associated document processor.

Preferably, the system and method include the ability to communicate with an associated financial institution so as to secure data for use in verification of the document request. In another embodiment, the system and method are able to communicate accounting data with an associated financial institution.

In yet another embodiment, in the event of a rejection of the document processing request, a notification of the rejection is transmitted to the associated and additional information relating to the document processing request is received from the associated user. The acceptability of the document processing transaction is then verified in accordance with received additional information.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description, serve to explain the principles of the invention.

DETAILED DESCRIPTION OF THE PREFERRED EMBODIMENTS

Figure 1:
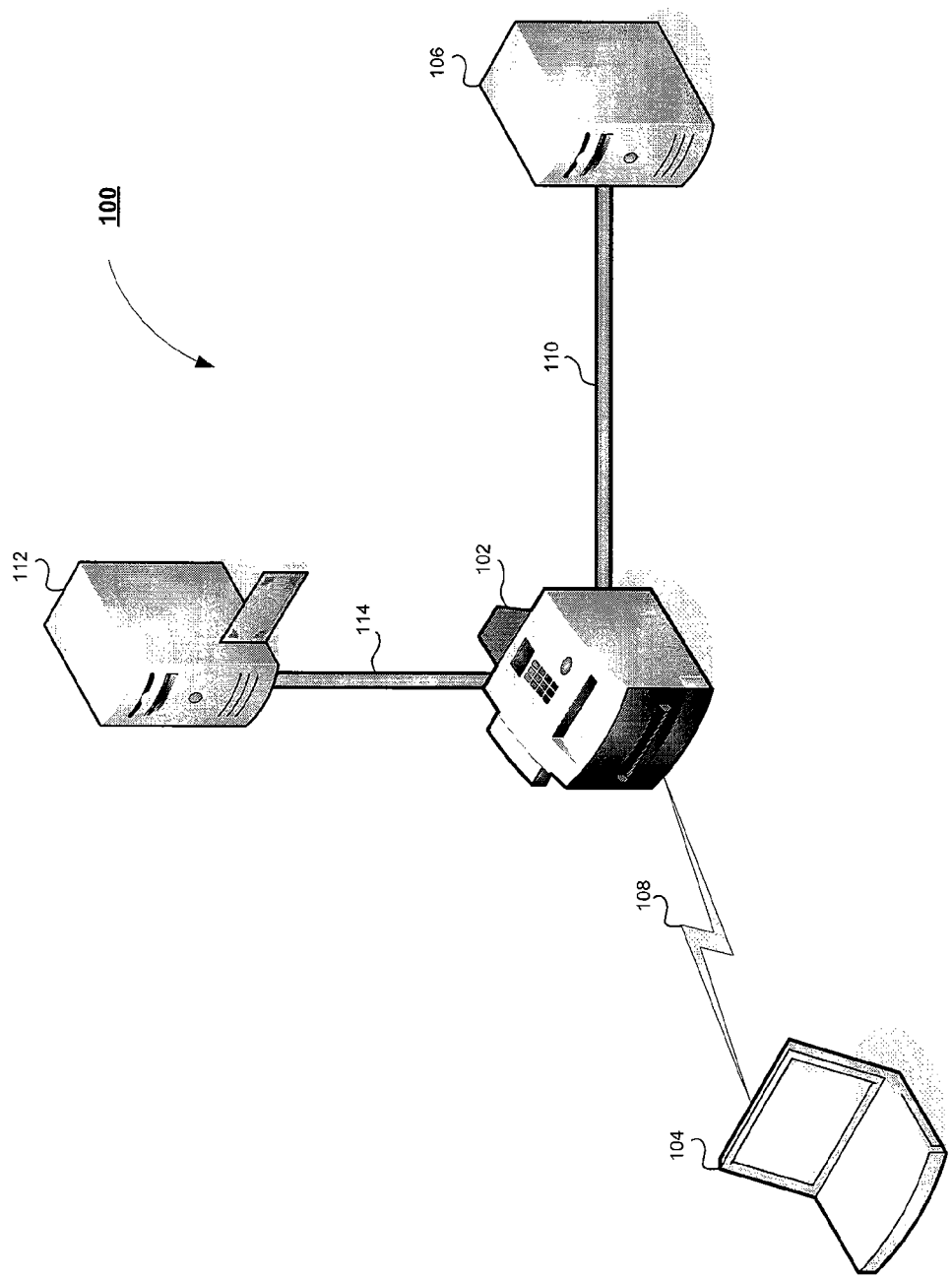
FIG. 1 is a diagram illustrating a system for providing fee-based data services to users according to the present invention.

The present invention is directed to a system and method for providing fee-based data services to mobile users. A diagram illustrating the system 100 is shown in FIG. 1. In the present invention, a user is provided access to a document processing device as illustrated by multifunction peripheral device 102, for generating or processing image data. It is to be appreciated that document processing device is any suitable document processing device known in the art, such as a copier, printer, scanner, facsimile and the like, or any combination thereof. Suitable commercially available document processing peripherals include, but are not limited to, the Toshiba e-Studio Series Controller.

Preferably, the user access the device in a non-office environment, such as an airport lounge or business center. Other non-office environment locations include, but limited to, university campuses, conference centers, libraries, and hotels. The user accesses the multifunctional peripheral device 102 directly or via a computer or other suitable interface 104 via a suitable communication link 108. As will be understood by those skilled in the art, the communications link 108 is any means for communication between two electronic devices, for example and without limitation, an Ethernet based network, infrared connection, Wi-Fi connection, telephone connection, cellular telephone connection, Bluetooth connection and the like or a combination thereof. The user interface 104 suitably comprises a touch-screen or other input/output device capable of displaying and receiving user instructions for the operation of the multifunctional peripheral device 102.

The multifunctional peripheral is connected to an associated central server 106 via a suitable communication link 110, as described above. The user is then provided with information about the services available to be performed. The information is provided in any suitable manner known in the art. The information is suitably provided by way of a user interface associated with the multifunctional peripheral device 102 or documentation provided related thereto.

The multifunctional peripheral is also connected to a point of sale server 112 via a communication link 114. The point of sale server 112 is any suitable server or system known in the art. The point of sale server 112 functions in connection with multifunctional peripheral device and allows for credit or prepaid charges, and the authorization and posting of user transaction charges. The multifunctional peripheral device 102 submits an authorization request to the point of sale server 112. The point of sale server authorizes or rejects the transaction request. If the transaction is authorized, the transaction details are transmitted to the point of sale server 112. The transaction request is then closed and a confirmation is transmitted to the multifunctional peripheral device 102. The system also has the ability to select a certain point of sale server 112 for performing authorization and authenticating such server for processing transaction requests, ensuring that data transfers are secure, and detecting and correcting errors in the authorization process or financial data.

The user is then provided with information about the available payment options for paying for the desired services. The payment options include any suitable payment options known in the art for charging for mobile fee-based services. Suitable payment options include, but are not limited to, credit cards, debits, prepaid accounts, coupons, toll calls (e.g. 900 number calls), and partner accounts. These payment options are suitably group accounts and individual accounts. The user then selects the desired payment option from the options provided. The requirements for paying the fees depend on the payment option selected. If the user selects the credit card option, the user is prompted to provide selected information about the user's credit card, such as credit card type, credit card number, the credit card holder's name, and the expiration date. The information is suitably provided by the user using any suitable means known in the art. Examples of such input are by direct user input via a keyboard interface or the like, or by access to a pre-stored information on a memory device, such as a magnetic strip, embedded data storage or an intelligent card. The information is then sent to the central server or the point of sale server via the communication link for authentication and approval from the credit card company. Such information is provided by the central server or the point of sale server to the credit card company by any suitable method known in the art. Given that sensitive information is being transmitted, a suitable security encryption or authentication system, as will be readily appreciated by one of ordinary skill in the art, is advantageously used. The authentication of the information and the transaction approval is provided by any suitable method known in the art. Preferably, the user is informed of the status of the approval. Preferably, if the transaction is not approved, the user is requested to submit information for an alternative credit card. In one embodiment, the user's credit card or account is charged for every transaction at the time of the transaction. In another embodiment, the user's credit card is charged for the transactions monthly or other suitable periodic interval.

If the user selects the prepaid account option, the user is prompted to open a prepaid account by a suitable method known in the art. Preferably, the user is prompted to open the prepaid account via a web-enabled user interface at specified URL that is served by the central server or the point of sale server. The user provides selected information about a credit card or other type of debit card to open the account. Upon authentication of the information and approval of the use of the credit card by any suitable means, the user is issued an account identification and associated password for the account. Information about the account is maintained in any suitable database or repository, preferably, on the central server or the point of sale server. In one embodiment, the balance maintained in the user account is debited every time the user accesses services on the system. In another embodiment, the balance is debited every month or other suitable periodic interval. The user may replenish the account by any suitable means at any time.

If the user selects the coupon option, the user is prompted to provide selected information about the coupons, such as the coupon issuer and the coupon number. This information is sent to the central server or the point of sale server by any suitable means known in the art. The authentication of the information and the transaction approval is provided by any suitable method known in the art. Preferably, the user is informed of the status of the approval. Preferably, if the transaction is not approved, the user is requested to correct the information or provide alternative information. Preferably, the user is provided information about any applicable limits or restrictions on services associated with the use of the coupons, such as the number of pages printed.

If the user selects the partner account option, the user is prompted to select a third party account provider from a list of available options by any suitable means. Examples of partner accounts, include, but are not limited to, Sprint PCS, AOL, Liberty Alliance, MS Passport, and AT&T. The user is prompted to provide selected information about the account, such as the account or user identification, and password. The information is provided to the central server or the point of sale server by any suitable means known in the art. Such information is provided by the central server to the partner company by any suitable method known in the art. The authentication of the information and the transaction approval is provided by any suitable method known in the art. Preferably, the user is informed of the status of the approval. Preferably, if the transaction is not approved, the user is requested to correct the information or provide alternative information. In one embodiment, the user's account is charged for every transaction at the time of the transaction. In another embodiment, the user's account is charged for the transactions monthly or other suitable periodic interval.

After selecting the desired payment option, the user is prompted to provide selected information about the desired service to be performed. If the user desires generate or receive image data using the multifunctional peripheral device and then store or archives such image data in an associated repository, the user is prompted to provide information related to the repository. For example, the user is requested to provide the name or URL of the repository, the user identification, password, and duration that the information is to be stored in the repository. If the user desires to generate or receive image data and then transmit the image data to at least one selected destination, the user is prompted to provide information about the at least one destination. If the user desires to generate or receive image data and then print the image data, the user is prompted to provide information about the parameters for printing the image data.

The user is then prompted to select the desired parameters for receiving the image data, such as resolution, orientation, and finishing options. After receiving such information, the system performs the desired document processing operation. Preferably, after performing the desired document processing operation, the system provides the user with the total cost associated with the selected services.

It is understood however, that the total cost associated with the selected services is suitably also provided to the user prior to generating or transferring the image data. Once the user has reviewed the costs and then accepted the services by any suitable means known in the art, the services are performed.

Preferably, the system provides a report of the status of the services to the user. Preferably, the user is able to view the results and make any needed changes to the services if the results are not acceptable. Information relating to the services is stored in an associated repository, preferably located on the central server. The user is then billed for the services performed depending on the payment option selected by any suitable means known in the art. Preferably, a receipt is provided to the user upon completion of the services desired.

Figure 2:
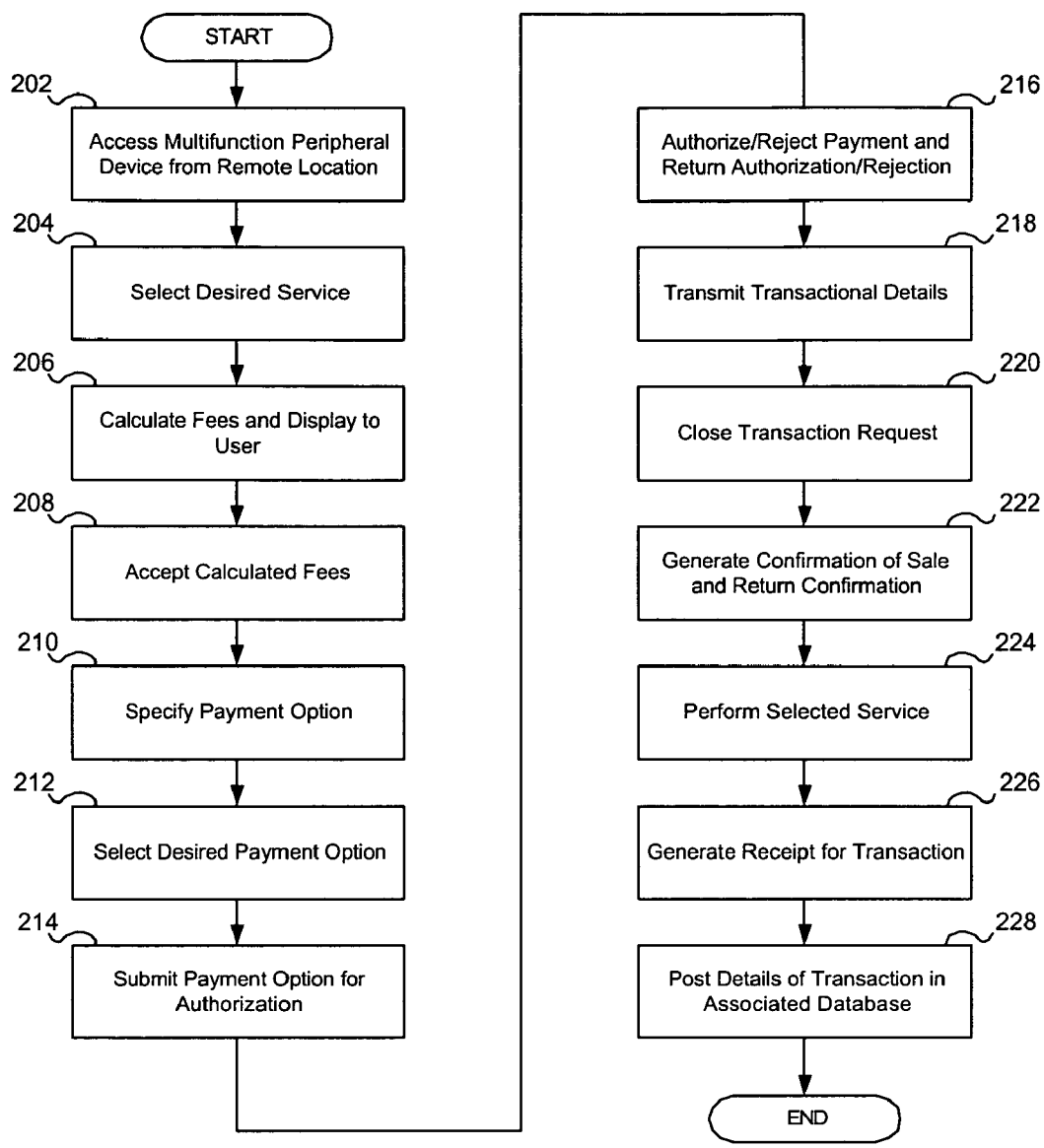
FIG. 2 is a flowchart illustrating the process for providing data services to a user according to the present invention.

FIG. 2 shows a flowchart for providing fee-based data services to users according to the present invention. As shown at 202, a user has access to a multifunctional peripheral device 102. The user accesses the multifunctional peripheral device via any suitable means, such as via a user interface associated with the multifunctional peripheral device. At 204, the user suitably selects the desired service.

At 206, the system calculates the appropriate charges via any suitable means and presents the charges to the user via for user approval. At 208, the user accepts the transaction. At 210, the user is prompted to specify a payment option via any suitable means and to provide the necessary information for the associated payment option.

At 212, the user selects the desired payment option and provides the information required to effectuate such payment via any suitable means. In one embodiment, the selection of the desired payment option includes the ability to select a certain or targeted point of sale server to handle the transaction. It is also understood that a system administrator is suitably able to select a certain or default point of sale server to handle selected transaction. For example, a certain point of sale server is suitably selected to handle the transactions for selected operations, users, or transaction amounts. In a preferred embodiment, if the selected point of sale server is not available to handle the selected transaction, a notification is then transmitted to the user or other authorized party as to such unavailability. Preferably, the user then selects a different point of sale server to handle such transaction.

At 214, the system submits the authorization request to the point of sale server via any suitable means. At 216, the point of sale server suitably approves or rejects the authorization request via and such approval or rejection information is transmitted to the multifunctional peripheral device or system. Such approval or rejection is based on suitable criteria or processes known in the art.

If the request is approved, then flow proceeds to 218, wherein the system transmits the transactional details to the point of sale server. The system then transmits a close transaction request to the point of sale server via any suitable means as shown at 220. Upon receipt of the transaction detail and the request to close the transaction request, the point of sale server generates a confirmation and transmits it to the multifunctional peripheral device or system as shown at 222. Upon confirmation, system performs the desired services as shown at 224.

At 226, a receipt for the transaction is generated by the multifunctional peripheral device. The details of the transaction are posted in an associated database via any suitable means for later retrieval as shown at 228.

If the request is rejected, then flow proceeds to 230, wherein the system transmits a close transaction request to the point of sale server via any suitable means. Upon receipt of the transaction detail and the request to close the transaction request, the point of sale server generates a confirmation and transmits it to the multifunctional peripheral device or system as shown at 232.

Figure 3:
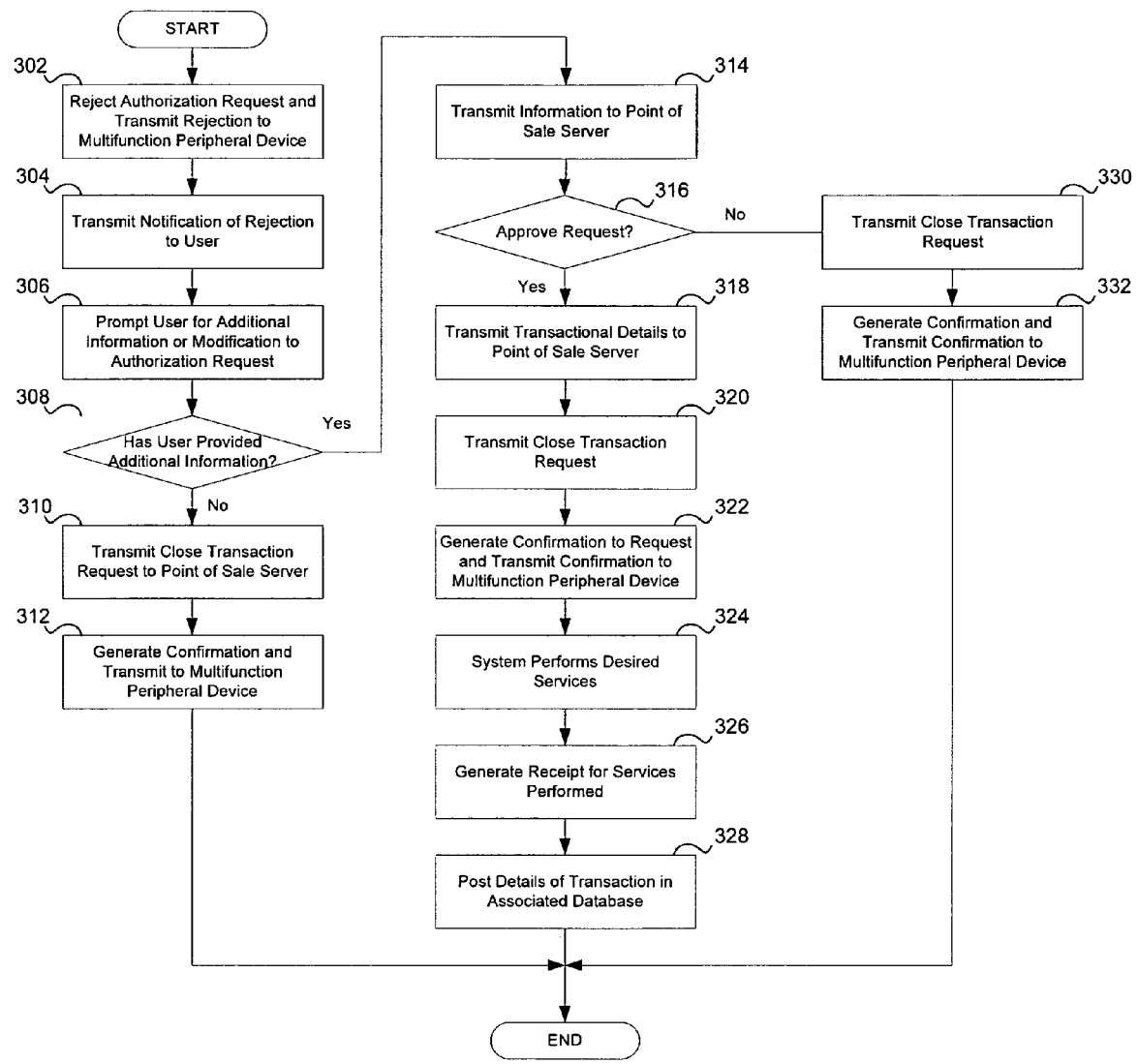
FIG. 3 is a flowchart illustrating the process for handling rejected document processing requests.

In a preferred embodiment, if a document processing request is rejected, the user is notified of such rejection and provided an opportunity to correct any problems or defect associated with such request. FIG. 3 is a flowchart illustrating the process for handling rejected document processing requests. At 302, the point of sale server suitably rejects the authorization request and such rejection information is transmitted to the multifunctional peripheral device or system. At 304, a notification containing the rejection information is transmitted to the user via any suitable means, such as an electronic mail message. At 306, the user is prompted to provide additional or modified information relating to the request to correct any defects or errors in the original request which resulted in the rejection. For example, the user may have entered the wrong account number or password to access his credit card or prepaid account. At 308, a determination is made whether the user has provided addition or modified information. If the user has not provided such information, flow proceeds to 310, wherein the system transmits a close transaction request to the point of sale server via any suitable means. Upon receipt of the transaction detail and the request to close the transaction request, the point of sale server generates a confirmation and transmits it to the multifunctional peripheral device or system as shown at 312.

If the user has provided such information, flow proceeds to 314, wherein the information is transmitted to the point of sale server via any suitable means. At 316, the point of sale server approves or rejects the authorization request based on the additional information and such approval or rejection information is transmitted to the multifunctional peripheral device or system.

If the request is approved, then flow proceeds to 318 wherein the system transmits the transactional details to the point of sale server. The system then transmits a close transaction request to the point of sale server as shown at 320. Upon receipt of the transaction detail and the request to close the transaction request, the point of sale server generates a confirmation and transmits it to the multifunctional peripheral device or system as shown at 322. Upon confirmation, system performs the desired services as shown at 324. At 326, a receipt for the transaction is generated by the multifunctional peripheral device. The details of the transaction are posted in an associated database via any suitable means for later retrieval as shown at 328.

If the request is rejected, then flow proceeds to 330, wherein the system transmits a close transaction request to the point of sale server via any suitable means. Upon receipt of the transaction detail and the request to close the transaction request, the point of sale server generates a confirmation and transmits it to the multifunctional peripheral device or system as shown at 332.

While in the preferred embodiment the present invention is implemented in software, as those skilled in the art can readily appreciate it may also be implemented in hardware or a combination of software and hardware.

Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention.

What is claimed is:

1. A document processing system for use in a point-of-sale environment comprising:
    a plurality of document processors, wherein each document processor includes an input operable to receive electronic document data, a user interface and functionality of at least one of a printer, facsimile, scanner, copier, and optical character recognition device;
    means adapted for receiving a document processing request from an associated user for a document processing operation to be performed on a document processor from the plurality thereof selected by the associated user via a user interface associated therewith, the document processing operation including a data storage operation;
    means adapted for receiving payment data including an identity of the associated user, via the user interface, corresponding to a selected payment mechanism from the user, which payment data includes coupon data;
    means adapted for receiving, via the user interface, storage location data representative of a user-selected network storage location for the electronic document data;
    means adapted for communicating request data representative of a received document processing request from each document processor to a point-of-sale server inclusive of a payment processor for securing payment for document processing services, which request data includes data representative of an identity of the associated user, the payment data, and data representative of the document processing request;
    means adapted for processing payment acceptability data from the point of sale server in accordance with a test of the payment data and limitations associated with the payment data and the coupon data relative to the document processing operation;
    means adapted for generating a display representative of the limitations on the user interface;
    means adapted for prompting the user via the user interface for corrected payment data in accordance with received payment acceptability data indicative of erroneous payment data and the limitations;
    means adapted for receiving at the document processor, an authorization signal from the associated point-of-sale server, which authorization signal is representative of at least one of an approval and a rejection of the document processing request as determined via the point-of-sale server;
    means adapted for selectively enabling the selected document processor in accordance with a received authorization signal;
    means adapted for communicating the electronic document data to the network storage location in accordance with the received authorization signal;
    means adapted for generating accounting data representative of a completed document processing operation associated with the authorization signal;

means adapted for communicating the accounting data to the common point-of-sale server;
in the event of a rejection of the document processing request, means adapted for transmitting a notification of the rejection to the associated user;
means adapted for receiving additional information relating to the document processing request from the associated user;
means adapted for communicating data representing the additional information to the point-of-sale server; and
means adapted for receiving an authorization signal from the point-of-sale server, which authorization signal is representative of at least one of an approval and a rejection based on the additional information related to the document processing request.

2. The document processing system for use in a point-of-sale environment of claim 1, further comprising means adapted for sending a close transaction request to the point-of-sale server after completion of document processing operation.

3. The document processing system for use in a point-of-sale environment of claim 2, further comprising means adapted for receiving from the point-of-sale server a confirmation signal representative of a successful transmission of the a close transaction request.

4. The document processing system for use in a point-of-sale environment of claim 1, wherein the payment mechanism is at least one of a credit-based transaction and a debit-based transaction.

5. The document processing system for use in a point-of-sale environment of claim 1, further comprising means adapted for selecting a point-of-sale server to which the request data is communicated.

6. A document processing method for use in a point-of-sale environment comprising the steps of:
receiving a document processing request from an associated user for a document processing operation to be performed on an associated document processor selected from a plurality thereof by the associated user via a user interface associated therewith, which document processor includes an input operable to receive electronic document data, a user interface and functionality of at least one of a printer, facsimile, scanner, copier, and optical character recognition device, the document processing operation including a data storage operation;
receiving payment data including an identity of the associated user, via the user interface, corresponding to a selected payment mechanism from the user, which payment data includes coupon data;
receiving, via the user interface, storage location data representative of a user-selected network storage location for the electronic document data;
communicating request data representative of a received document processing request to a point-of-sale server inclusive of a payment processor for securing payment for document processing services, which request data includes data representative of an identity of the associated user, the payment data, and data representative of the document processing request;
processing payment acceptability data from the point of sale server in accordance with a test of the payment data and limitations associated with the payment data and the coupon data relative to the document processing operation;
generating a display representative of the limitations on the user interface;
prompting the user via the user interface for corrected payment data in accordance with received payment acceptability data indicative of erroneous payment data and the limitations;
receiving, at the document processor, an authorization signal from the common point-of-sale server, which authorization signal is representative of at least one of an approval and a rejection of the document processing request as determined via the point-of-sale server;
selectively enabling the selected document processor in accordance with a received authorization signal;
communicating the electronic document data to the network storage location in accordance with the received authorization signal;
generating accounting data representative of a completed document processing operation associated with the authorization signal;
communicating the accounting data to the common point-of-sale server;
in the event of a rejection of the document processing request, transmitting a notification of the rejection to the associated user;
receiving additional information relating to the document processing request from the associated user;
communicating data representing the additional information to the point-of-sale server; and
receiving an authorization signal from the point-of-sale server, which authorization signal is representative of at least one of an approval and a rejection based on the additional information related to the document processing request.

7. The document processing method for use in a point-of-sale environment of claim 6, further comprising the step of sending a close transaction request to the point-of-sale server after completion of document processing operation.

8. The document processing method for use in a point-of-sale environment of claim 7, further comprising the step of receiving from the point-of-sale server a confirmation signal representative of a successful transmission of the a close transaction request.

9. The document processing method for use in a point-of-sale environment of claim 6, wherein the payment mechanism is at least one of a credit-based transaction and a debit-based transaction.

10. The document processing method for use in a point-of-sale environment of claim 7 further comprising the step of selecting a point-of-sale server to which the request data is communicated.

11. A document processing system for use in a point-of-sale environment comprising:
an input operable for receiving a document processing request from an associated user for a document processing operation to be performed on an associated document processor selected from a plurality thereof by the associated user via a user interface associated therewith, which document processor includes an input operable to receive electronic document data, a user interface and functionality of at least one of a printer, facsimile, scanner, copier, and optical character recognition device, the document processing operation including a data storage operation;
an input operable for receiving payment data including an identity of the associated user, via the user interface, corresponding to a selected payment mechanism from the user, which payment data includes coupon data;

an input operable for receiving, via the user interface, storage location data representative of a user-selected network storage location for the electronic document data;

an output operable for communicating request data representative of a received document processing request to a point-of-sale server inclusive of a payment processor for securing payment for document processing services, which request data includes data representative of an identity of the associated user, the payment data, and data representative of the document processing request;

a processor operable for processing payment acceptability data from the point of sale server in accordance with a test of the payment data and limitations associated with the payment data and the coupon data relative to the document processing operation;

the processor further operable for generating a display representative of the limitations on the user interface;

the processor further operable for prompting the user via the user interface for corrected payment data in accordance with received payment acceptability data indicative of erroneous payment data and the limitations;

an input operable for receiving, at the document processor, an authorization signal from the common point-of-sale server, which authorization signal is representative of at least one of an approval and a rejection of the document processing request as determined via the point-of-sale server;

the processor further operable for selectively enabling the selected document processor in accordance with a received authorization signal;

an output operable for communicating the electronic document data to the network storage location in accordance with the received authorization signal;

the processor further operable for generating accounting data representative of a completed document processing operation associated with the authorization signal;

an output operable for communicating the accounting data to the common point-of-sale server;

in the event of a rejection of the document processing request, an output operable for transmitting a notification of the rejection to the associated user;

an input operable for receiving additional information relating to the document processing request from the associated user;

an input operable for communicating data representing the additional information to the point-of-sale server; and an input operable for receiving an authorization signal from the point-of-sale server, which authorization signal is representative of at least one of an approval and a rejection based on the additional information related to the document processing request.

12. The document processing system for use in a point-of-sale environment of claim 11, further comprising an output operable for sending a close transaction request to the point-of-sale server after completion of document processing operation.

13. The document processing system for use in a point-of-sale environment of claim 12, further comprising an input operable for receiving from the point-of-sale server a confirmation signal representative of a successful transmission of the a close transaction request.

14. The document processing system for use in a point-of-sale environment of claim 11, wherein the payment mechanism is at least one of a credit-based transaction and a debit-based transaction.

15. The document processing system for use in a point-of-sale environment of claim 12 wherein the processor is further operable for selecting a point-of-sale server to which the request data is communicated.

* * * * *